(12) United States Patent
Mar et al.

(10) Patent No.: US 9,293,015 B2
(45) Date of Patent: Mar. 22, 2016

(54) ELECTRICAL STIMULATION HAPTIC FEEDBACK INTERFACE

(71) Applicant: Immersion Corporation, San Jose, CA (US)

(72) Inventors: Richard Mar, Concord, CA (US); Danny Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 207 days.

(21) Appl. No.: 14/022,108

(22) Filed: Sep. 9, 2013

(65) Prior Publication Data

US 2015/0070145 A1 Mar. 12, 2015

(51) Int. Cl.
*G08B 6/00* (2006.01)
*G06F 3/01* (2006.01)

(52) U.S. Cl.
CPC ...... *G08B 6/00* (2013.01); *G06F 3/016* (2013.01); *G06F 3/011* (2013.01)

(58) Field of Classification Search
CPC ... G06F 3/016; G06F 3/011; G06F 2203/013; G06F 3/015; G08B 6/00; A63F 2300/1037
USPC ............ 345/156, 158, 173, 174; 341/22; 327/517; 340/407.1, 407.2; 463/30, 37; 178/18.03; 318/460; 600/545
See application file for complete search history.

(56) References Cited

U.S. PATENT DOCUMENTS

| 4,595,010 | A | 6/1986 | Radke |
| 6,930,590 | B2 | 8/2005 | Ling et al. |
| 8,311,623 | B2 | 11/2012 | Sanger |
| 2009/0088659 | A1* | 4/2009 | Graham et al. ............... 600/545 |
| 2012/0226330 | A1 | 9/2012 | Kolen et al. |
| 2012/0232780 | A1* | 9/2012 | Delson et al. ................. 701/400 |

FOREIGN PATENT DOCUMENTS

JP 6-182054 A 7/1994
WO 00/71217 A1 11/2000

OTHER PUBLICATIONS

Pedro Lopes et al., "Muscle-Propelled Force Feedback: Bringing Force Feedback to Mobile Devices", Human Factors in Computing Systems, Apr. 27, 2013, pp. 2577-2580, XP058043431.

* cited by examiner

*Primary Examiner* — Vijay Shankar
*Assistant Examiner* — Abhishek Sarma
(74) *Attorney, Agent, or Firm* — Miles & Stockbridge P.C.

(57) ABSTRACT

A haptic drive circuit for an electrical muscle stimulation electrode has an input for receiving a haptic signal based on a haptic effect from a haptic effects processor. The drive circuit contains logic for generating a electrical muscle stimulation current based on the haptic signal. An electrode in contact with a user's skin receives the electrical muscle stimulation current, causing a haptic effect by contraction and relaxation of muscles near the electrode.

20 Claims, 5 Drawing Sheets

ELECTRICAL STIMULATION HAPTIC FEEDBACK INTERFACE

FIELD

One embodiment of the present invention is directed to a haptic feedback interface. More particularly, one embodiment of the present invention is directed to a haptic feedback interface positioned to provide direct haptic feedback to muscles.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable and mobile electronic devices, such as cellular telephones, smartphones, portable gaming devices, vehicle based devices and interfaces, and a variety of other portable and mobile electronic devices. For example, some portable gaming applications are capable of vibrating in a manner similar to control devices (e.g., joysticks, etc.) used with larger-scale gaming systems that are configured to provide haptic feedback. Further, devices such as those connected to a vehicular power supply may provide haptic feedback over a range of voltage inputs.

In order to generate vibration effects, many devices utilize some type of actuator or haptic output device. Known actuators used for this purpose include an electromagnetic actuator such as a solenoid actuator, an Eccentric Rotating Mass ("ERM") actuator in which an eccentric mass is moved by a motor, a Linear Resonant Actuator vibration motor ("LRA"), or a piezo transducer. Typically, the power source input voltage for the haptic actuator controls the haptic actuator at a certain current draw. A combination of current and voltage vary the haptic response provided by the actuator. A haptic controller regulates the current provided to the haptic actuator to provide a varying haptic experience based on the desired current level.

Electrical muscle stimulation ("EMS") uses electrical currents applied in proximity to muscles to cause muscle contractions by stimulating the muscle nerves. The current is applied to the skin, typically through electrodes applied to the skin placed near the muscle to be contracted. Current can be applied to the electrode by a controller using impulses to cause the muscle to quickly contract and relax. EMS has traditionally been used in sports medicine, exercise, and physical therapy.

SUMMARY

One embodiment includes a haptic drive circuit for an electrical muscle stimulation electrode has an input for receiving a haptic signal based on a haptic effect from a haptic effects processor. The drive circuit contains logic for generating a electrical muscle stimulation current based on the haptic signal. An electrode in contact with a user's skin receives the electrical muscle stimulation current, causing a haptic effect felt by the user by contraction and relaxation of muscles near the electrode.

DETAILED DESCRIPTION

One embodiment is a haptic feedback interface that receives a haptic control signal, processes the signal into an electrical impulse, and applies the impulse to electrode pads on a user's skin, causing contractions in muscles near to the electrode pads. A user interface device connects to a haptic control system which determines haptic effects to provide to a user. The haptic control system provides a control signal corresponding to the haptic effects. The haptic feedback interface produces corresponding electrical impulses applied to electrodes located on the user's skin near targeted muscles.

In recent years, computer systems have become available that allow interaction without actual physical contact. For example, some gaming systems use a camera to sense player movement and translate such movement to avatar movement on the screen. Others interfaces are being developed for interacting with a computer system screen without actually touching the screen or other input device. One possible drawback of such non-physical interactions is that the player or user generally loses the opportunity to receive haptic feedback that can be available through vibratory sensations. Known solutions to providing haptic feedback in such circumstances include providing vibratory feedback to users through wearable devices such as gloves or objects placed in pockets or other contact with the body. These systems can be bulky because they generally need both self-contained vibratory haptic actuators and power sources. Another solution, as described herein, is to use EMS to provide haptic feedback through pulsed current applied to a user's skin to produce muscle contractions. The impulse current causes muscles to alternate between a contracted state and a relaxed state which can feel similar to vibratory feedback. The voltage level of the impulse current may be adjusted to provide a stronger or weaker muscle contraction. EMS feedback may also be combined with vibratory feedback to provide additional haptic feedback options.

Figure 1:
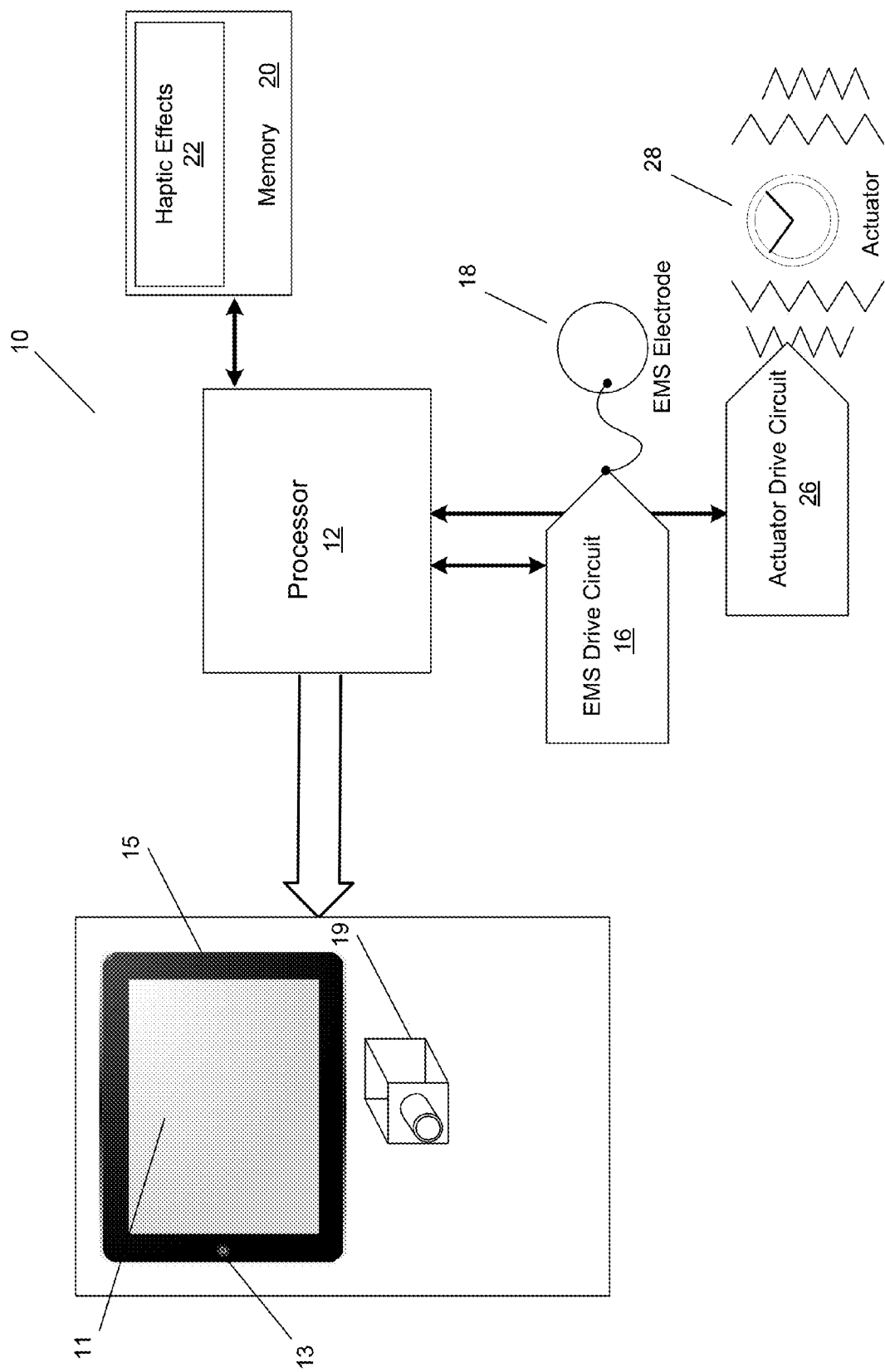
FIG. 1 is a block diagram of a haptically-enabled system in accordance with one embodiment of the present invention.

FIG. 1 is a block diagram of a haptically-enabled system 10 in accordance with one embodiment of the present invention. System 10 may include a touch sensitive surface 11 or other type of user interface mounted within a housing 15, and may include mechanical keys/buttons 13. System 10 may include other or alternative sensors, such as a sensor 19, to detect user interaction without physical contact with the visual interface. For example, sensor 19 may be a camera used to detect user movement and interaction. In another example, sensor 19 may be integrated into the electrodes described below or otherwise positioned on the body. System 10 may include other or alternative devices for interacting with system 10, including game controllers or haptic gloves. System 10 may also include a physical or virtual display device to provide images to the user. Examples of such displays may include overlay or heads-up type displays such as Google Glass or virtual reality displays such as the Oculus Rift VR display, both of which can provide displays to support interaction with virtual objects. Internal to system 10 is a haptic feedback system that generates an impulse current by system 10 for EMS and generates vibrations by system 10 for vibratory haptic effects. In one embodiment, the impulse currents are provided to electrodes. For embodiments including vibratory haptic effects, vibrations may be generated on touch surface 11. In one embodiment, system 10 is integrated into a gaming system. In another embodiment, system 10 is integrated into an augmented or virtual reality interface. In some embodiments, stimulation may be direct to the human body using other compatible techniques as those described herein.

The haptic feedback system includes a processor or controller 12. Coupled to processor 12 is a memory 20 and an EMS drive circuit 16, which is coupled to an EMS electrode pad 18. Electrode 18 can be any type of direct skin contact electrode and includes an electrical transfer medium to conduct the electrical signal received to the skin. Electrode 18 may include a substance to improve conduction with the skin. Electrode 18 may also include a substance to provide adhesion qualities to keep the electrode in place on the skin. Optionally, processor 12 may also be coupled to an actuator drive circuit 26, which is coupled to an actuator 28. Actuator 28 can be any type of motor, including an ERM, LRA, piezo transducer, or solenoid actuator.

Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency, and duration. For EMS effects, low level parameters, such as current impulse patterns across one or more electrodes could also be used to determine a particular haptic effect. For vibratory haptic effects, low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to EMS drive circuit 16, which includes electronic components and circuitry used to supply electrode 18 with the required electrical impulse current and voltage (i.e., "EMS signals") to cause the desired haptic effects. System 10 may include more than one electrode 18, and each electrode may include a separate drive circuit 16, all coupled to a common processor 12. Drive circuit 16 and one or more electrodes 18 may be integrated into a band, belt, or other wearable item, which may provide several points of contact with the skin, with each point of contact being in proximity to a different muscle. For example, a glove may include electrodes for each finger, hand, and wrist, configured to receive impulse currents individually or as a group. Electrode 18 is not limited to any particular size or shape. For example, a glove may be made out of material to serve as one large electrode covering the entire surface of the hand, a medium size electrode may be placed on the forearm or bicep area, or small electrodes may be placed on each finger of the hand.

In embodiments including vibratory haptic effects, processor 12 outputs the control signals to actuator drive circuit 26, which includes electronic components and circuitry used to supply actuator 28 with the required electrical current and voltage (i.e., "motor signals") to cause the desired haptic effects. System 10 may include more than one actuator 28, and each actuator may include a separate drive circuit 26, all coupled to a common processor 12.

Memory device 20 can be any type of storage device or computer-readable medium, such as random access memory ("RAM") or read-only memory ("ROM"). Memory 20 stores instructions executed by processor 12. Among the instructions, memory 20 includes a haptic effects module 22 which are instructions that, when executed by processor 12, generate EMS signals for electrode 18 or drive signals for actuator 28 that provide haptic effects, as disclosed in more detail below. Parameters for particular haptic effects may be stored in a haptic effects bank located in memory 20 and accessible by haptic effects module 22. Memory 20 may also be located internal to processor 12, or any combination of internal and external memory.

Touch surface 11 recognizes touches as interaction information, and may also recognize the position and magnitude of touches on the surface. In embodiments using a camera or sensors to determine interaction, sensor 19 may use techniques to recognize body position and movement, and translate such positions and movements into interaction information. The data corresponding to the interaction information is sent to processor 12, or another processor within system 10, and processor 12 interprets the interaction information and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images. Sensor 19 may sense movement using any sensing technology, including infrared, optical, or non-visual capturing and may process input using object detection, edge detection, pixel analysis, differential calculations, and the like. In embodiments where a touch surface is not used, touch surface 11 may be substituted for a display system and interaction may be accomplished via sensor 19 or physical interaction, such as with a game pad, mouse, keyboard, or the like.

System 10 may be a handheld device, such a cellular telephone, personal digital assistant ("PDA"), smartphone, computer tablet, gaming console, vehicle based interface, virtual reality interface, augmented reality interface, etc., or may be any other type of device that includes a haptic effect system that includes one or more EMS electrodes 18. System 10 may also optionally include traditional vibratory actuators to provide physical vibration sensations. Thus, system 10 may be a mixed system of EMS electrodes and vibratory actuators. The user interface may be a touch sensitive surface, or any other type of user interface such as a mouse, touchpad, mini-joystick, scroll wheel, trackball, game pads or game controllers, etc., or may be a non-physical interface provided by one or more sensors such as sensor 16. In embodiments with more than one actuator, each actuator may have a different rotational capability in order to create a wide range of haptic effects on the device.

Figure 2:
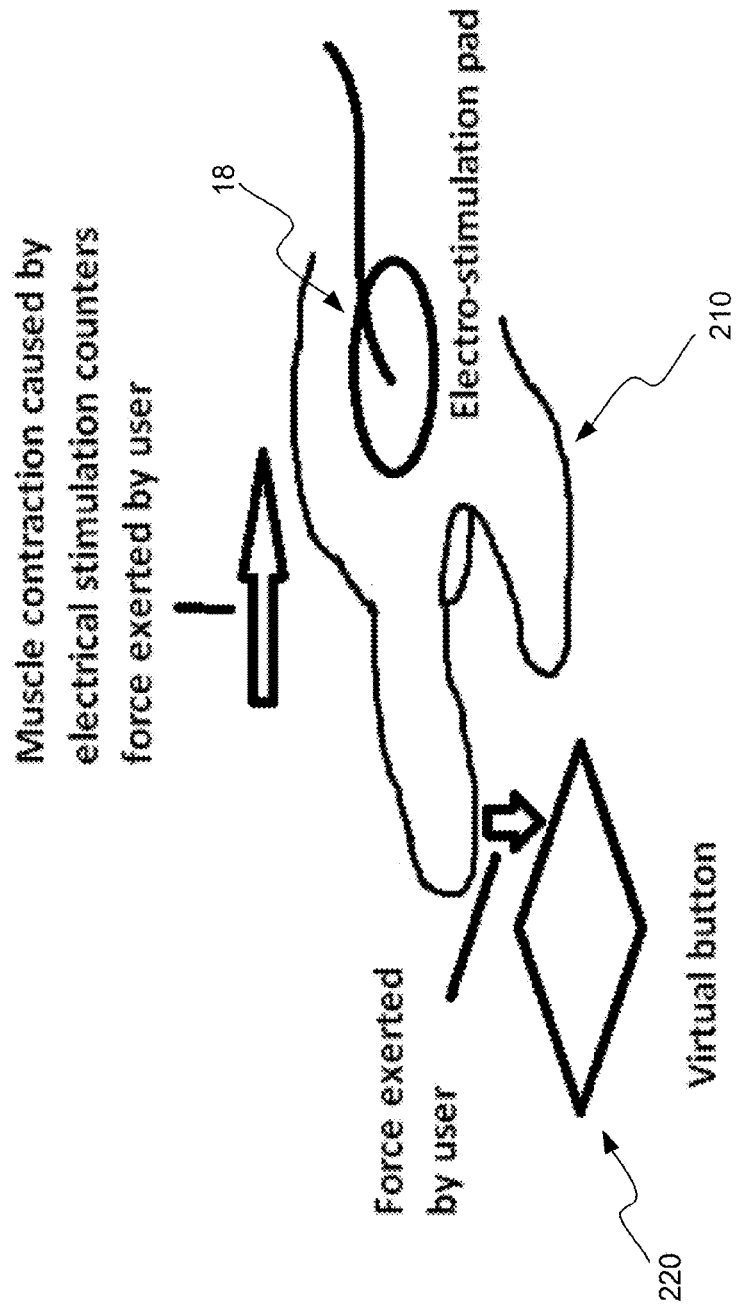
FIG. 2 illustrates a user interacting with a virtual button and receiving an electrical muscle stimulation response in accordance with one embodiment.

FIG. 2 illustrates a user interacting with a virtual button 220 and receiving an electrical muscle stimulation response in accordance with one embodiment. A user may be using an overlay or heads-up type display, such as Google Glass, or a virtual reality interface, such as the Oculus Rift VR display. A user's hand 210 has an electro-stimulation pad or EMS electrode 18 attached to the hand in proximity to muscles located in the hand or finger. Sensor 19 determines that the user presses virtual button 220 without physically contacting a physical button. In response, processor 12 determines a haptic effect to provide from the effects bank stored in memory 20. Processor 12 sends a control signal to EMS drive circuit 16, which in turn provides an impulse current to electrode 18, causing muscles in hand 210 to contract, thereby providing a haptic feedback of the finger movement on virtual button 220.

The haptic feedback may feel like an opposing force to the movement pressing the button. The feedback may also include a buzzing, vibrating, or pulsing feeling in the hand generated by the muscles in the hand in response to the impulse current provided through electrode 18. Thus, physical feedback of the movement pressing virtual button 220 is provided.

Figure 3:
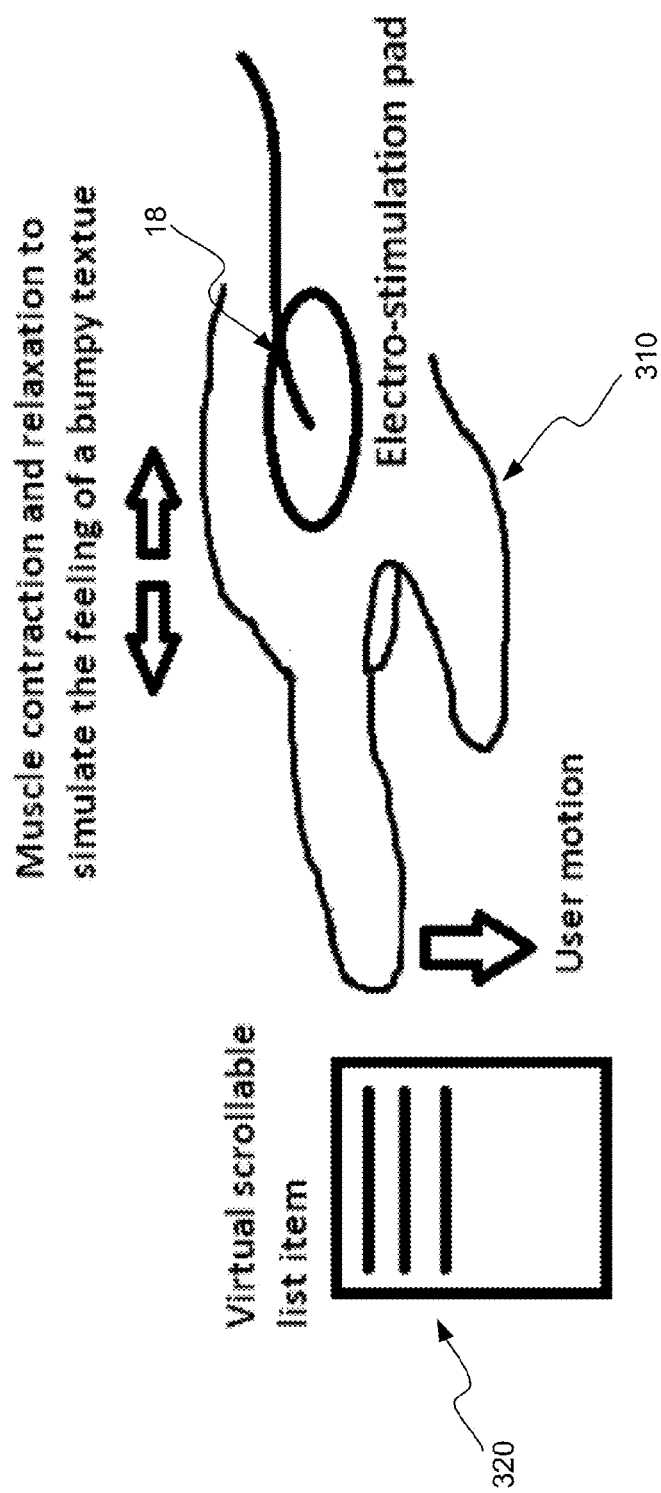
FIG. 3 illustrates a user interacting with a virtual scrollable list item and receiving an electrical muscle stimulation response in accordance with one embodiment.

FIG. 3 illustrates a user interacting with a virtual scrollable list item 320 and receiving an electrical muscle stimulation response in accordance with one embodiment. A user may again be using an overlay or heads-up type display, such as Google Glass, or a virtual reality interface, such as the Oculus Rift VR display. A user's hand 310 has an electro-stimulation pad or EMS electrode 18 attached to the hand in proximity to muscles located in the hand or finger. Sensor 19 determines that the user is scrolling list item 320 without physically contacting a physical button. In response, processor 12 determines a haptic effect to provide from the effects bank of memory 20. Processor 12 sends a control signal to EMS drive circuit 16, which in turn provides an impulse current to electrode 18, causing muscles in hand 310 to contract, thereby providing a haptic feedback of the finger movement on list item 320.

The haptic feedback may feel like an opposing force to the movement pressing the button. Similar to the above, the feedback may also include a buzzing, vibrating, or pulsing feeling in the hand generated by the muscles in the hand in response to the impulse current provided through electrode 18. Thus, physical feedback of the movement pressing virtual button 220 is provided.

One of ordinary skill in the art will understand that the uses illustrated by FIGS. 2 and 3 are merely examples. EMS electrodes may be used in a wide variety of configurations, including targeting specific muscles and applying currents in particular ways to the EMS electrodes to produce a particular feedback sensation. For example, electrodes placed up the arm at intervals could be signaled to provide a sensation of something crawling up the arm. This may be done by triggering an impulse current to one electrode and then a second impulse current to the next electrode sequentially, fading the voltage level from one impulse current to the next so that some overlap occurs between the two impulse currents. One will also understand that embodiments disclosed herein may take advantage of advancements in electrode technology, including electrode type, electrode configuration, muscle targeting, and current pulsing techniques, without undue experimentation. Embodiments disclosed herein may also implement haptic feedback according to notifications rather than interaction with a system. For example, an EMS electrode may activate when a user receives a telephone call.

Another example of the use of EMS is in providing haptic feedback in cold climates. Feedback provided by vibratory actuators may be muffled by layers of clothing or may not be felt due to reduced sensation level in the cold. EMS electrodes may be incorporated into clothing or applied to the skin to provide directed haptic feedback to muscles or muscle groups. Such feedback is more likely to be felt in cold climates because feedback is primarily sensed in the contraction of muscles as opposed to the surface of the skin. For example, a ski lift operator may receive EMS feedback or notifications each time a person disembarks from the lift.

In some embodiments, an EMS feedback signal is provided natively by processor 12 as illustrated in FIG. 1. However in other embodiments, EMS feedback may be retrofitted into a vibratory haptic feedback system. In such embodiments, a converting unit may be used in conjunction with or integrated into EMS drive circuit 16 that converts the signal provided by processor 12 into a signal for use by drive circuit 16 and EMS electrode 18. For example, a signal produced by processor 12 may be a desired current output level for an ERM actuator. This signal may be received by a converting unit that converts the signal for use by EMS drive circuit 16. In some embodiments, drive circuit 16 may integrate the converting function internally to the circuit.

In some embodiments, a haptic signal intended for use by a vibratory actuator drive circuit is produced by processor 12. The vibratory haptic signal may correspond to a vibration magnitude represented by a number. A converter may convert the vibratory haptic signal into an EMS feedback signal by mapping vibration magnitude values found in a vibratory haptic signal to EMS output levels. For example, a high vibration magnitude could be represented by an EMS signal with higher voltage and higher frequency current pulses, which would cause muscles near EMS electrode 18 to contract with more force and frequency (shorter periods of contraction/relaxation) than would occur with a vibratory haptic signal indicating a lower vibration magnitude. These mappings may be customized depending on the type of electrode and surface area contact of EMS electrode 18, as well as other factors, such as a measurement of a body's electrical resistance.

Figure 4:
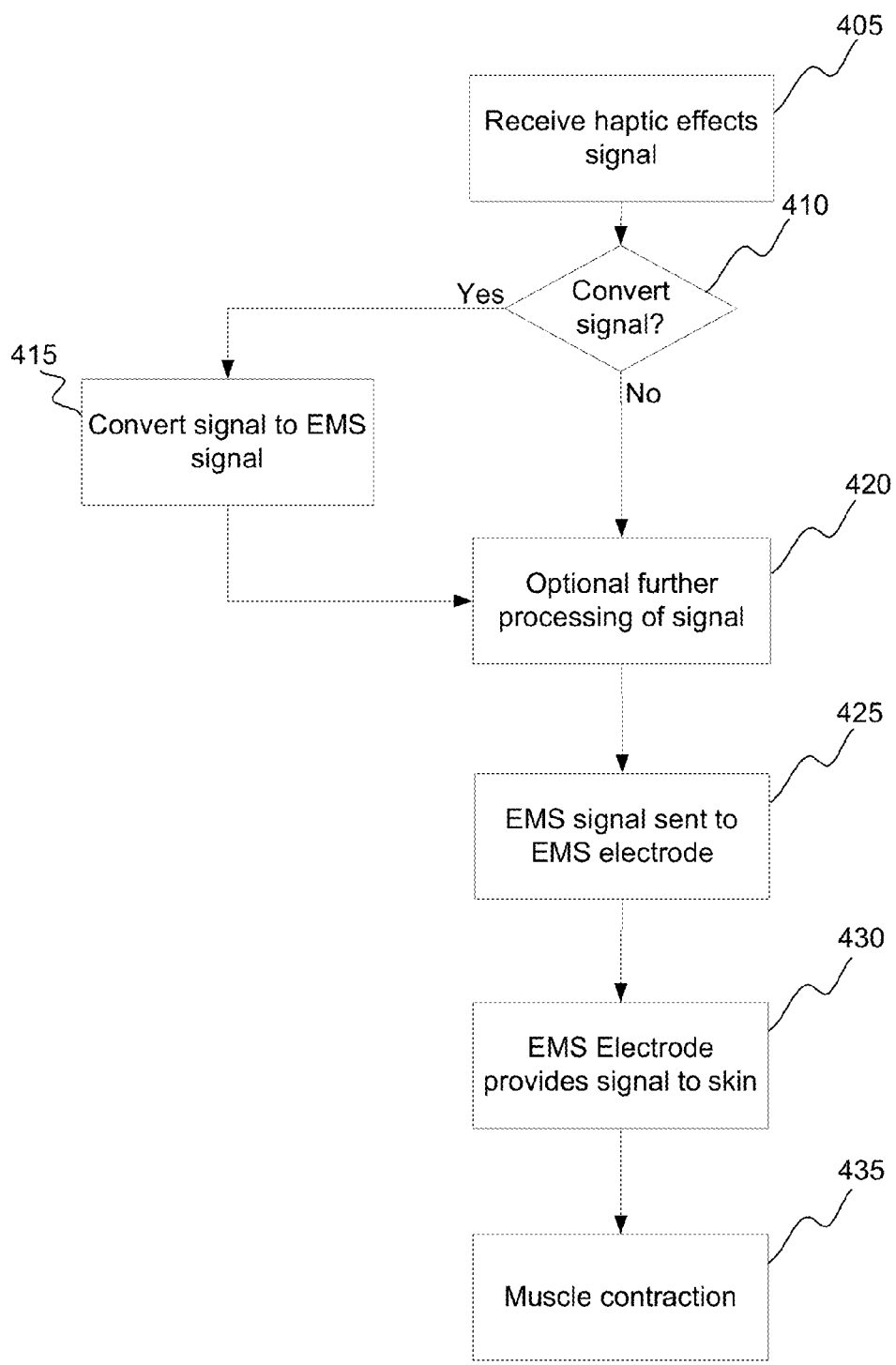
FIG. 4 is a flow diagram illustrating the functionality of an EMS drive circuit of FIG. 1 in accordance with some embodiments.

FIG. 4 is a flow diagram illustrating the functionality of EMS drive circuit 16 of FIG. 1 in accordance with some embodiments. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 405, drive circuit 16 receives a signal from processor 12 for providing haptic feedback to a user. Processor 12 can generate the signal based on a program or hardware interface that determines whether haptic feedback is appropriate and which kind of haptic feedback to provide. For example, processor 12 may be integrated into a gaming system that displays a character avatar on a screen and includes sensor 19, such as a camera. A user may interact with the avatar by moving a body part; sensor 19 may observe the movement, interpret the movement, and have the avatar move in a corresponding manner on the screen. The system may also include a component that provides haptic signals to the user to enhance interaction. The signals may coincide with the avatar's reactionary movement to the user's movement interacting with the game. For example, suppose one game involved turning a combination dial on a safe. The user may lift a hand and make gripping and turning motions with the hand and fingers. The screen may show the user's avatar (or portion thereof) likewise lifting its hand, gripping the dial, and turning the dial. With known techniques, the system can provide a signal to a haptic interface worn by the user to provide vibratory signals to haptic actuators located in gloves. The actuators can vibrate when the user turns the dial, vibrating once for each "click" of the dial as it turns. The vibratory signal corresponds to the haptic feedback provided to the user. In some embodiments, however, a provided haptic signal can be interpreted to a signal suitable for EMS feedback via an electrode attached to the hand. In the example with the safe, rather than producing a vibratory feedback, the system may produce current impulses in a manner to cause the muscles in the hand to contract in such a manner to provide a "click" sensation to the hand for each click on the dial.

The signal provided at 405 in some embodiments may be a signal that is ready to provide to an electrode as part of the EMS feedback or in some embodiments may be a signal that would be traditionally received by a vibratory actuator's drive circuit. If the latter, then drive circuit 16 can convert the signal into a signal appropriate to provide to an EMS electrode. At 410, drive circuit 16 determines if the signal received needs to be converted to an EMS signal or not. At 415, if the signal needs to be converted into an EMS signal, drive circuit 16 may process the signal to convert it to an EMS signal corresponding to a haptic effect provided by processor 12. Once the signal is converted, the flow diagram moves to element 420.

Referring back to 410, if the signal received from processor 12 does not need to be converted, the flow diagram moves to element 420, joining the branch of the flow diagram from element 415. At 420, further processing may be done on the signal to provide a desired EMS effect to EMS electrode 18. For example, a user can configure a maximum intensity level set by the voltage and/or current level for the EMS signal and the processing in 420 may normalize the provided EMS signal to be no more than the maximum in preparation for sending the signal to EMS electrode 18. Similarly, the system may sense or be configured with the contact area of EMS electrode 18 and adjust the magnitude of the EMS signal accordingly, e.g., EMS electrodes with larger contact areas may need a greater intensity level for the EMS current pulses sent to the EMS electrodes relative to smaller EMS electrodes. The system may sense or be configured with a value representing the electrical resistance of the wearer of EMS electrode 18 to adjust the intensity of the signal relative to the characteristics of the wearer. For example, a person's electrical impedance can alter with their hydration level, body fat level, and other factors. People with a higher impedance may require a signal of greater intensity to achieve the same haptic effect as a person with a lower impedance.

At 425, the EMS signal is sent to EMS electrode 18 as a current pulse at a voltage level corresponding to the signal received at 405 from processor 12. At 430, EMS electrode 18 provides the current pulse to the skin across the contact area. At 435, muscles in proximity to electrode 18 contract and relax according to the current pulse, including frequency, duration, and intensity or magnitude.

The flow diagram of FIG. 4 is executed in real time or substantially in real time, meaning that as a signal is received it is immediately processed and sent out as an EMS impulse current. There is no buffering (other than de minimus delay that may be introduced by circuit components). In some embodiments, the determination at 410 may not be performed, if for example, the type of signal is already known. In such cases, the corresponding flow element at 415 or 420 would be entered. For example, in retrofit applications where an EMS electrode replaces a vibratory actuator, the signal provided by processor 12 may always be expected to be a signal that would be used to signal a vibratory actuator, and if so, flow element 410 could be skipped and execution at 415 may proceed from 405. Likewise, in EMS specific applications, the determination at 410 need not be performed if the type of signal is expected to be an EMS signal. In such cases, the flow may proceed from element 405 directly to element 420.

In some embodiments EMS drive circuit 16 may include an EMS controller approved by the Food and Drug Administration ("FDA") for providing electro-muscular stimulation. Other circuitry may also be included in drive circuit 16 for providing signal conversion and control of the EMS controller.

Figure 5:
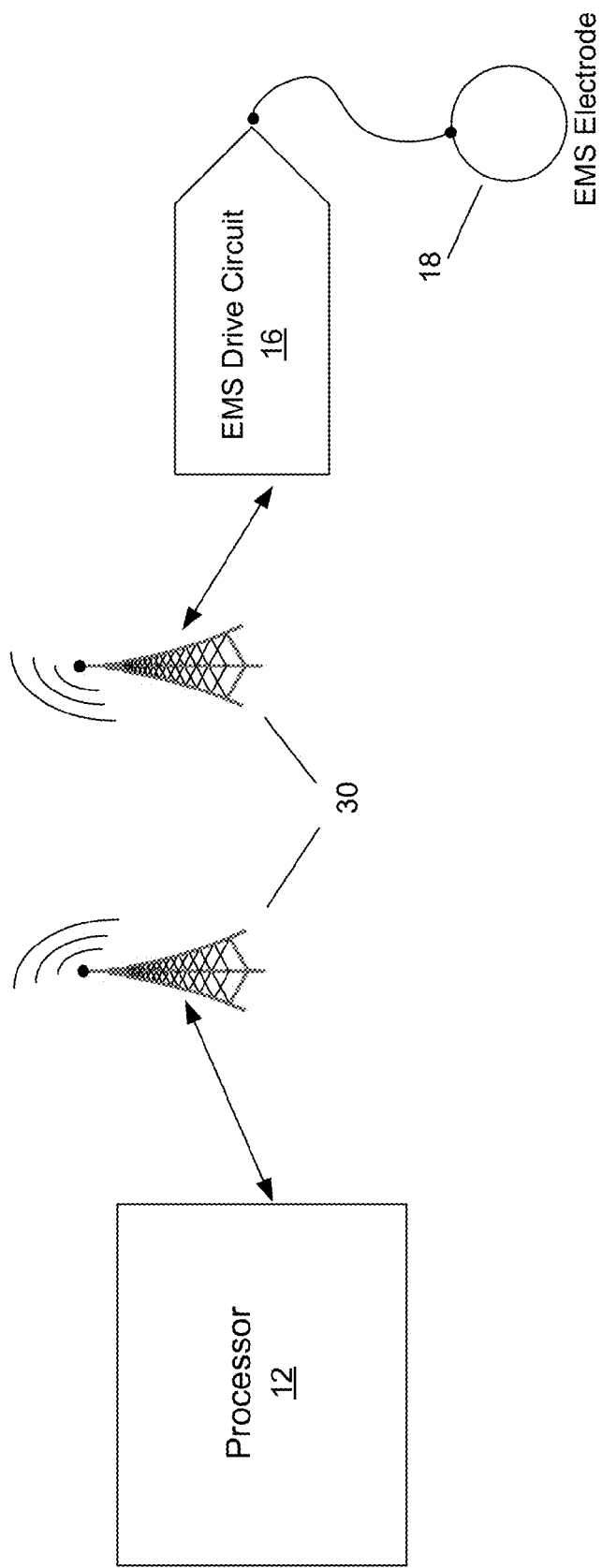
FIG. 5 is a diagram illustrating optional wireless characteristics of a haptic feedback system according to some embodiments.

FIG. 5 is a diagram illustrating optional wireless characteristics of system 10 according to some embodiments. In some embodiments, the wearable characteristics of an EMS feedback system are further enhanced by the use of wireless features to improve mobility of system 10. Transmitter/receiver devices 30 may be incorporated in the system so that the signal sent by processor 12 may be transmitted wirelessly to drive circuit 16. In combined systems including both vibratory actuators and EMS electrodes, the signal may also by transmitted wirelessly to drive circuit 26. One skilled in the art will understand that transmitter/receiver 30 may be suited for transmitting and receiving signals using any technology in the electromagnetic spectrum. For example, the technology used by transmitter/receiver 30 may be based on radio frequency technologies such as Bluetooth or wireless Ethernet or based on light frequency technologies such as infrared light. Magnetic induction technologies may also be used for wireless signal transmission. Drive circuit 16 may be worn by the user, for example, on a belt along with a power source. In some embodiments, one or more of EMS drive circuits 16 may be connected wirelessly to processor 12 and have located locally to electrode 18 along with a power source.

As disclosed, embodiments implement an electrical stimulation haptic feedback interface including a processor for sending haptic signals to an EMS drive circuit, an EMS drive circuit for receiving the haptic signals and providing EMS signals to an electrode, and at least one electrode for receiving EMS signals corresponding to the haptic signals provided by the processor. The EMS haptic feedback interface may be part of a larger system that receives input corresponding on a user's interaction with the system, processes the input to determine which haptic effects would provide appropriate feedback to the user, and provides haptic effect information to the EMS feedback interface.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:
1. A drive circuit for an electrode, the drive circuit comprising:
an input for receiving a first haptic signal, wherein the first haptic signal is based on a first haptic effect determined by a processor, wherein the first haptic effect is in response to a virtual contact with a user interface, and the virtual contact is without physical contact with the user interface;

logic for generating a first current based on the haptic signal; and a first electrode for receiving and relaying the first current, wherein the first electrode is adapted to contact with a user's skin, and wherein the first current is transmitted to the first electrode, the first current causing the first haptic effect to be generated by contraction and relaxation of muscles near the first electrode;

wherein the contraction and relaxation of muscles simulates physical contact with the user interface.

2. The drive circuit of claim 1, further comprising:

an input for receiving a second haptic signal, wherein the second haptic signal is based on a second haptic effect determined by the processor;

logic for generating a second current based on the second haptic signal; and a second electrode for receiving and relaying a second current, wherein the second electrode is adapted to contact with a user's skin, but not in contact with the first electrode, and wherein the first and second currents provide the second haptic effect by contracting and relaxing muscles near the first electrode and muscles near the second electrode at different times to simulate movement along a body part of the user.

3. The drive circuit of claim 1, wherein the first haptic signal is intended for generating haptic feedback in a vibratory actuator; and the first current is generated based on a map of vibratory haptic signal values to electrical muscle stimulation signal values.

4. The drive circuit of claim 1, wherein the first current is regulated to be no more than a maximum magnitude.

5. The drive circuit of claim 1, wherein the first haptic signal is received wirelessly by a receiver.

6. The drive circuit of claim 1, wherein the virtual contact with the user interface comprises virtual contact with a virtual button, and the first haptic effect comprises simulating pushing the virtual button.

7. The drive circuit of claim 1, wherein the first haptic signal is received in response to a movement of the user interacting with a game system.

8. A haptically-enabled system comprising:

an electrical muscle stimulation (EMS) drive circuit, wherein the drive circuit:

receives a first haptic signal from a haptic controller, wherein the first haptic signal is based on a first haptic effect determined by a processor, wherein the first haptic effect is in response to a virtual contact with a user interface, and the virtual contact is without physical contact with the user interface;

generates a first EMS current based on the first haptic signal; and an electrode, wherein the electrode:

receives a first EMS current from the drive circuit; and
provides the first EMS current to an electrically conductive medium, wherein the medium is in contact with a user's skin;

wherein the first EMS current causes the first haptic effect to be generated by contraction and relaxation of muscles near the first electrode, wherein the contraction and relaxation of muscles simulates physical contact with the user interface.

9. The system of claim 8, further comprising:

a second electrode, where in the electrode:

receives a second EMS current from the drive circuit; and provides the second EMS current to an electrically conductive second medium, wherein the second medium is in contact with a user's skin, but is separate from the medium of the first electrode; and wherein the drive circuit is further configured to:

receive a second haptic signal, wherein the second haptic signal is based on a second haptic effect determined by the processor; and generate a second current based on the second haptic signal; and wherein the first and second currents provide the second haptic effect by contracting and relaxing muscles near the first electrode and muscles near the second electrode at different times to simulate movement along a body part of the user.

10. The system of claim 8, wherein the first haptic signal is intended for generating haptic feedback in a vibratory actuator; and the drive circuit generates the first current based on a map of vibratory haptic signal values to electrical muscle stimulation signal values.

11. The system of claim 8, wherein the first current is regulated to be no more than a maximum magnitude.

12. The system of claim 8, wherein the first haptic signal is received wirelessly by a receiver.

13. The system of claim 8, wherein the virtual contact with the user interface comprises virtual contact with a virtual button, and the first haptic effect comprises simulating pushing the virtual button.

14. The system of claim 8, wherein the first haptic signal is received in response to a movement of the user interacting with a game system.

15. A method of providing a haptic effect comprising:

receiving, at an electrical muscle stimulation (EMS) drive circuit, a first haptic signal from a processor, wherein the first haptic signal is based on a first haptic effect determined by the processor, wherein the first haptic effect is in response to a virtual contact with a user interface, and the virtual contact is without physical contact with the user interface;

generating, at the EMS drive circuit, a first EMS current based on the first haptic signal;

receiving, at an electrode, the first EMS current from the EMS drive circuit; and providing, at the electrode, the first EMS current to an electrically conductive medium, wherein the medium is in contact with a user's skin, the first EMS current causing the first haptic effect to be generated by contraction and relaxation of muscles near the electrode;

wherein the contraction and relaxation of muscles simulates physical contact with the user interface.

16. The method of claim 8, further comprising:

receiving, at the EMS drive circuit, a second haptic signal, wherein the second haptic signal is based on a second haptic effect determined by the processor;

generating, at the EMS drive circuit, a second current based on the second haptic signal;

receiving, at a second electrode, a second EMS current from the drive circuit; and providing, at the second electrode, the second EMS current to an electrically conductive second medium, wherein the second medium is in contact with a user's skin, but is separate from the medium of the first electrode, wherein the first and second currents provide the second haptic effect by contracting and relaxing muscles near the first electrode and muscles near the second electrode at different times to simulate movement along a body part of the user.

17. The method of claim 15, wherein the first haptic signal is intended for generating haptic feedback in a vibratory actuator, and
wherein the drive circuit generates the first current based on a map of vibratory haptic signal values to electrical muscle stimulation signal values.

18. The method of claim 15, wherein the first current is regulated to be no more than a maximum magnitude.

19. The method of claim 15, wherein the first haptic signal is received wirelessly by a receiver.

20. The method of claim 15, wherein the virtual contact with the user interface comprises virtual contact with a virtual button, and the first haptic effect comprises simulating pushing the virtual button.

* * * * *